United States Patent [19]
Druschel

[11] Patent Number: 6,017,207
[45] Date of Patent: Jan. 25, 2000

[54] APPARATUS FOR ADJUSTING DIE LIP GAP

[75] Inventor: Robert L. Druschel, Eau Claire, Wis.

[73] Assignee: Cloeren Incorporated, Orange, Tex.

[21] Appl. No.: 08/936,655

[22] Filed: Sep. 24, 1997

Related U.S. Application Data

[60] Provisional application No. 60/025,305, Sep. 24, 1996, abandoned.

[51] Int. Cl.[7] ........................................... B29C 47/16
[52] U.S. Cl. .......................... 425/141; 425/381; 425/466
[58] Field of Search ................................ 425/133.5, 186, 425/141, 190, 192 R, 465, 466, 376.1, 381; 264/176.1

[56] References Cited

U.S. PATENT DOCUMENTS

| | | |
|---|---|---|
| 3,264,686 | 8/1966 | Soloduk . |
| 3,829,274 | 8/1974 | Melead ................................... 425/466 |
| 3,836,313 | 9/1974 | Stafford .................................. 425/466 |
| 3,859,032 | 1/1975 | Krupa . |
| 3,870,453 | 3/1975 | Howard .................................. 425/466 |
| 3,877,857 | 4/1975 | Melead ................................... 425/466 |
| 5,679,383 | 10/1997 | Ryan et al. . |

FOREIGN PATENT DOCUMENTS

| | | |
|---|---|---|
| 1009215 | 12/1996 | Belgium . |
| 0805014 | 11/1997 | European Pat. Off. . |
| 1-114412 | 5/1989 | Japan ..................................... 425/466 |
| 2162119 | 1/1986 | United Kingdom ................... 425/466 |

OTHER PUBLICATIONS

Drawing AT (Figs. 1 to 3).

Prior Art Sliding Wedge Deckle Drawing.

Prior Art R–Bar Adjustment Assembly Drawing.

*Primary Examiner*—Patrick Ryan
*Assistant Examiner*—Joseph Leyson
*Attorney, Agent, or Firm*—Timothy R. Kroboth

[57] ABSTRACT

An extrusion apparatus including a flexible lip for adjusting the lip gap, and including reciprocally movable members in operative contact with the flexible lip is described. Beneficially, a generally laterally movable actuator bar is connected to angled slots of the reciprocally movable members by pin members rotatably mounted in bores of the actuator bar. Lateral movement of the actuator bar advantageously results in lip gap control across the full width of the lip gap. Use of reciprocally movable members with slots of selected angles provides for profiling the lip gap. Also provided is an advantageous mechanism for controlling movement of the actuator bar and reciprocally movable members.

17 Claims, 10 Drawing Sheets

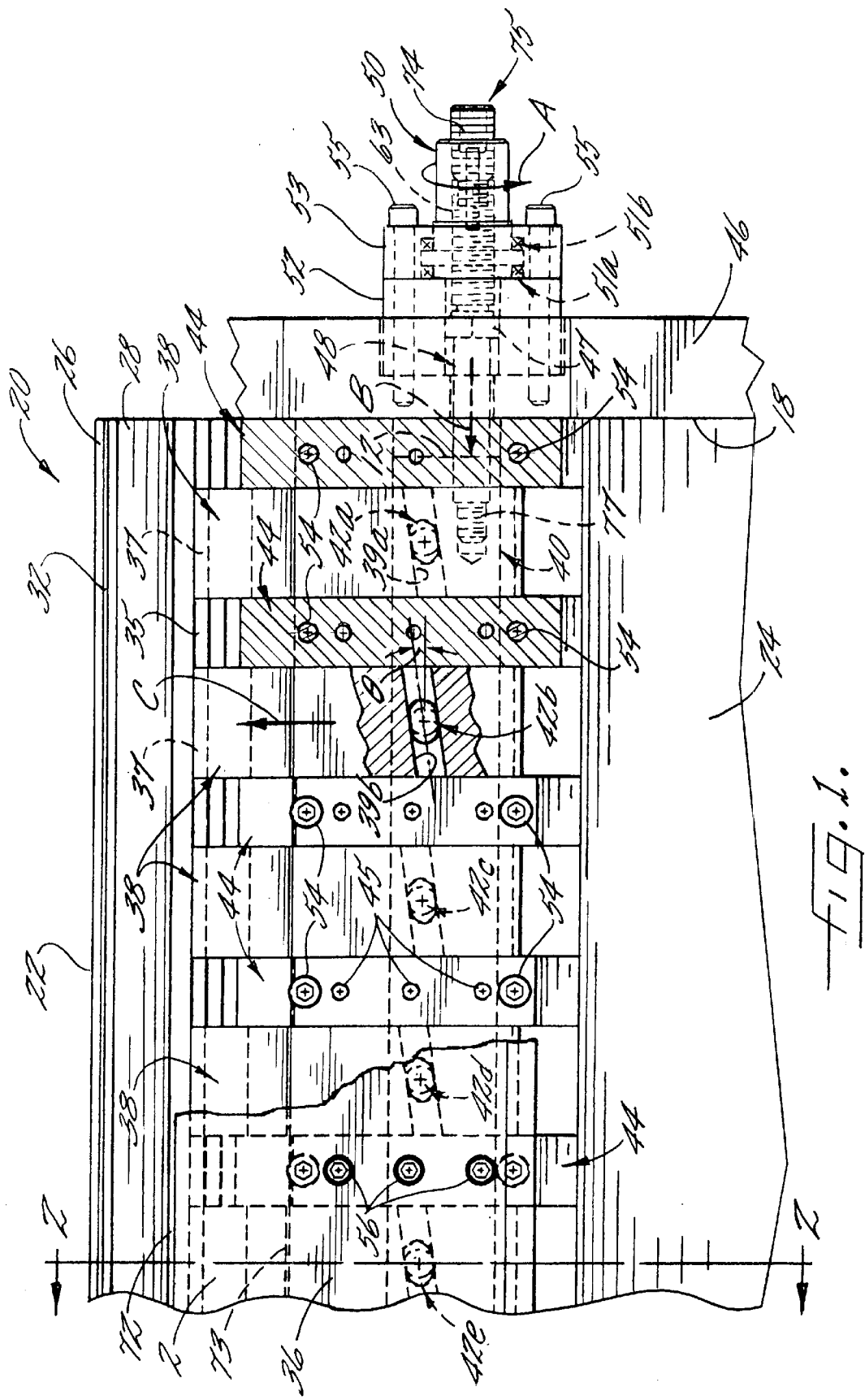

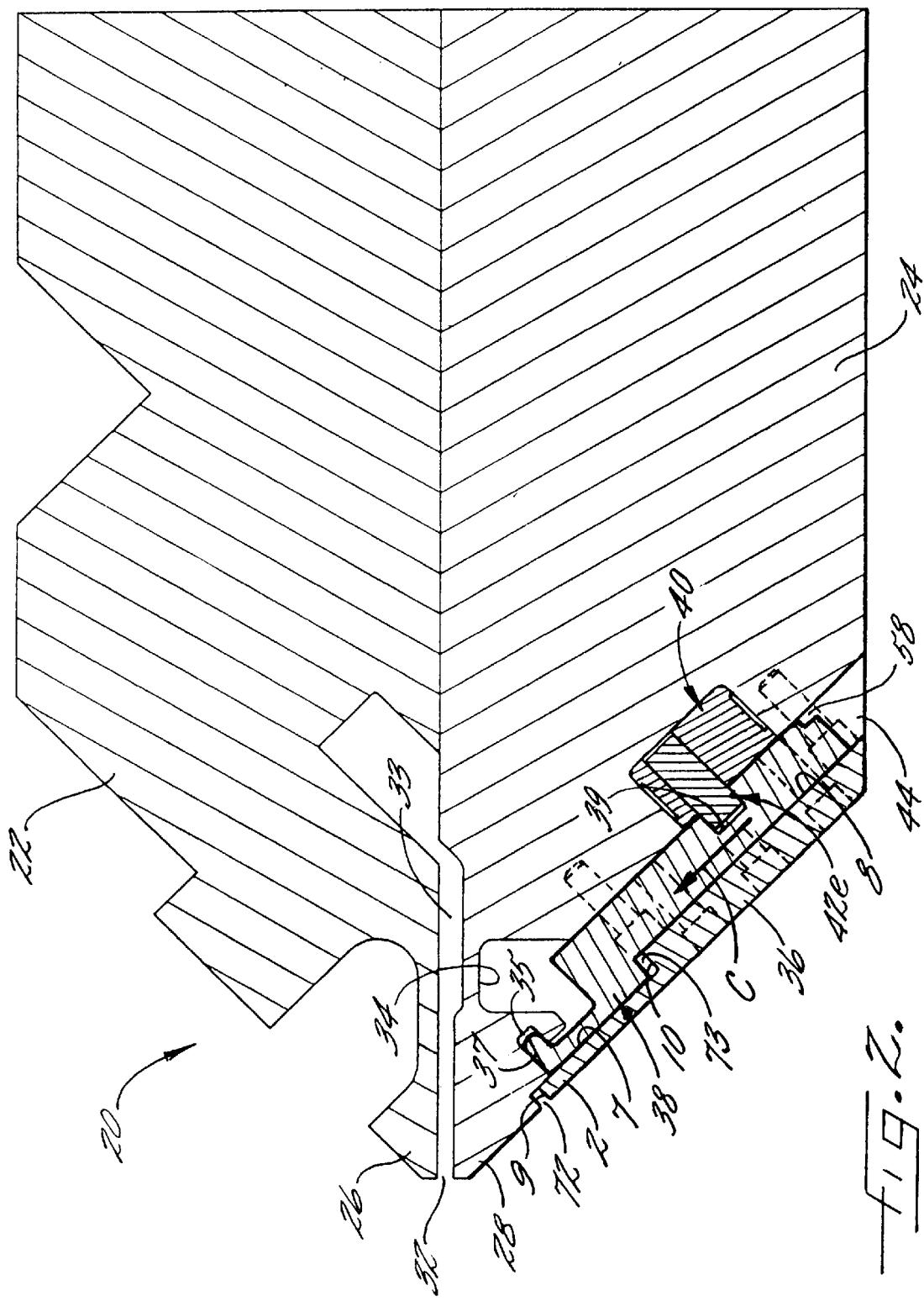

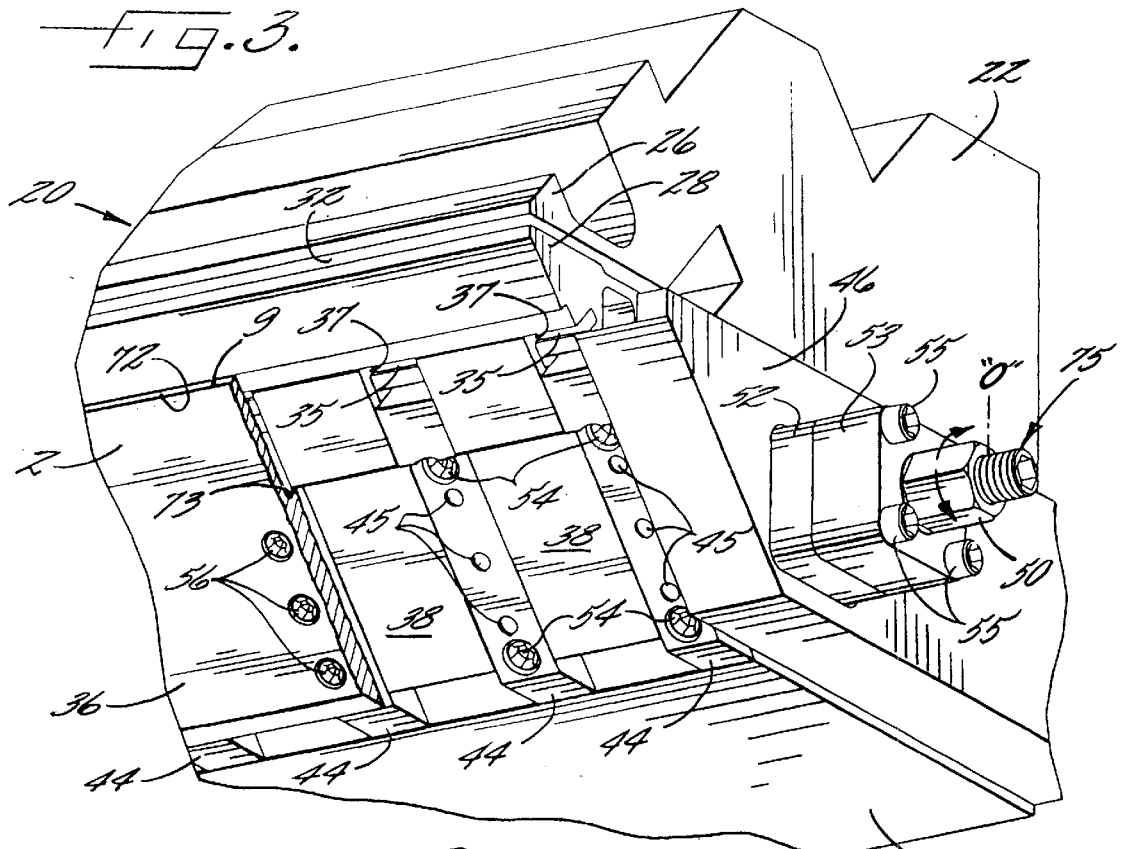

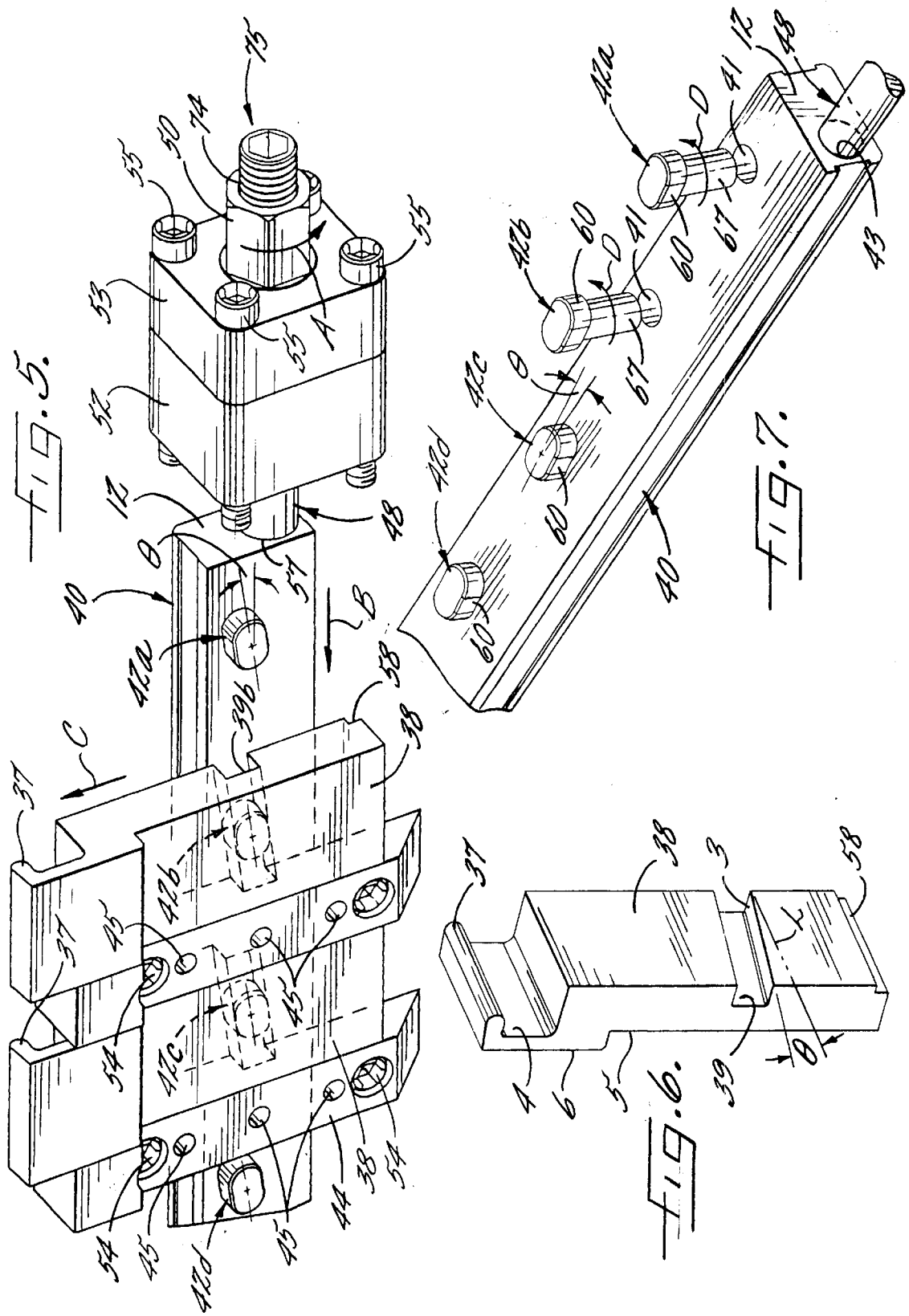

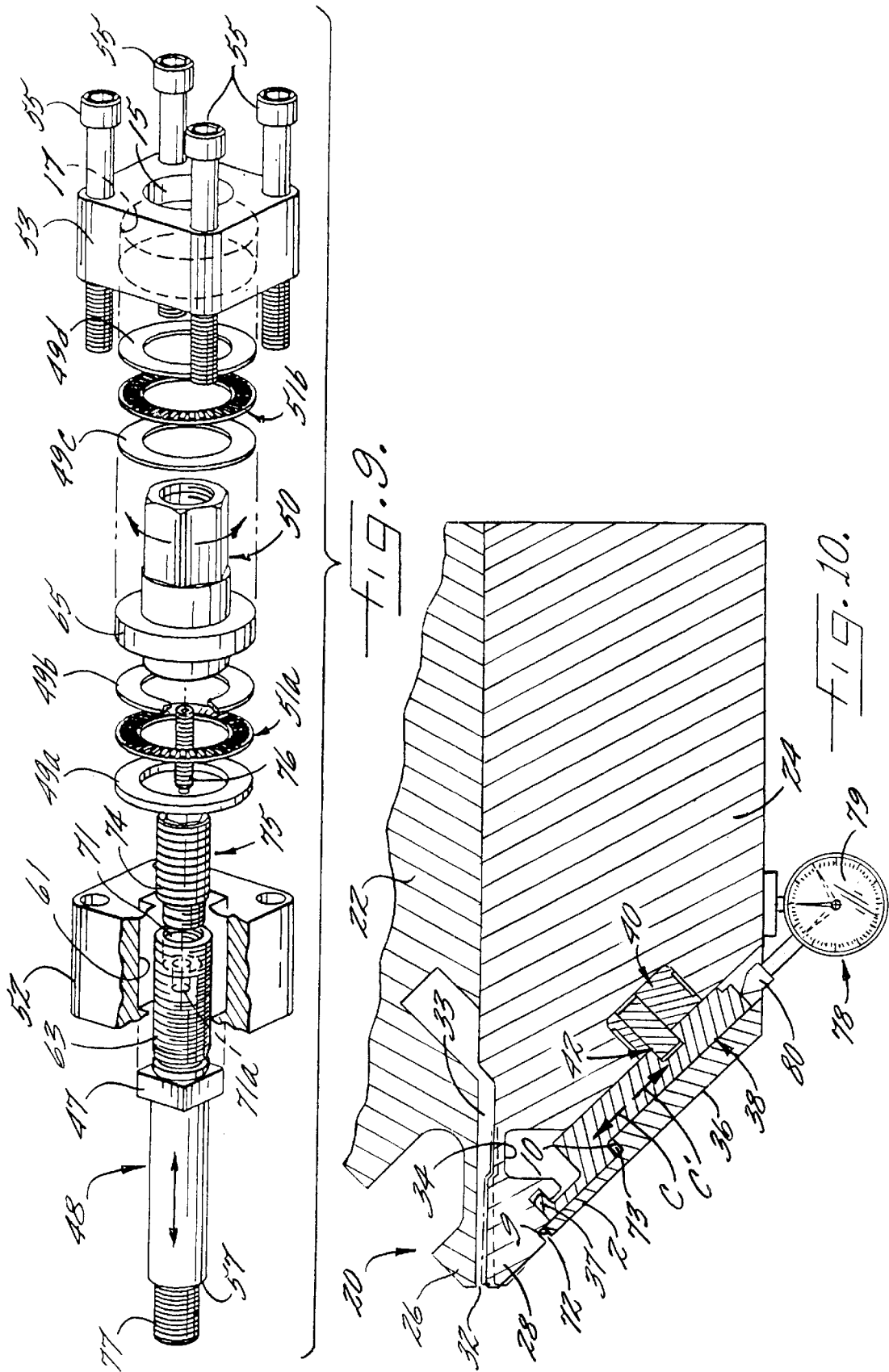

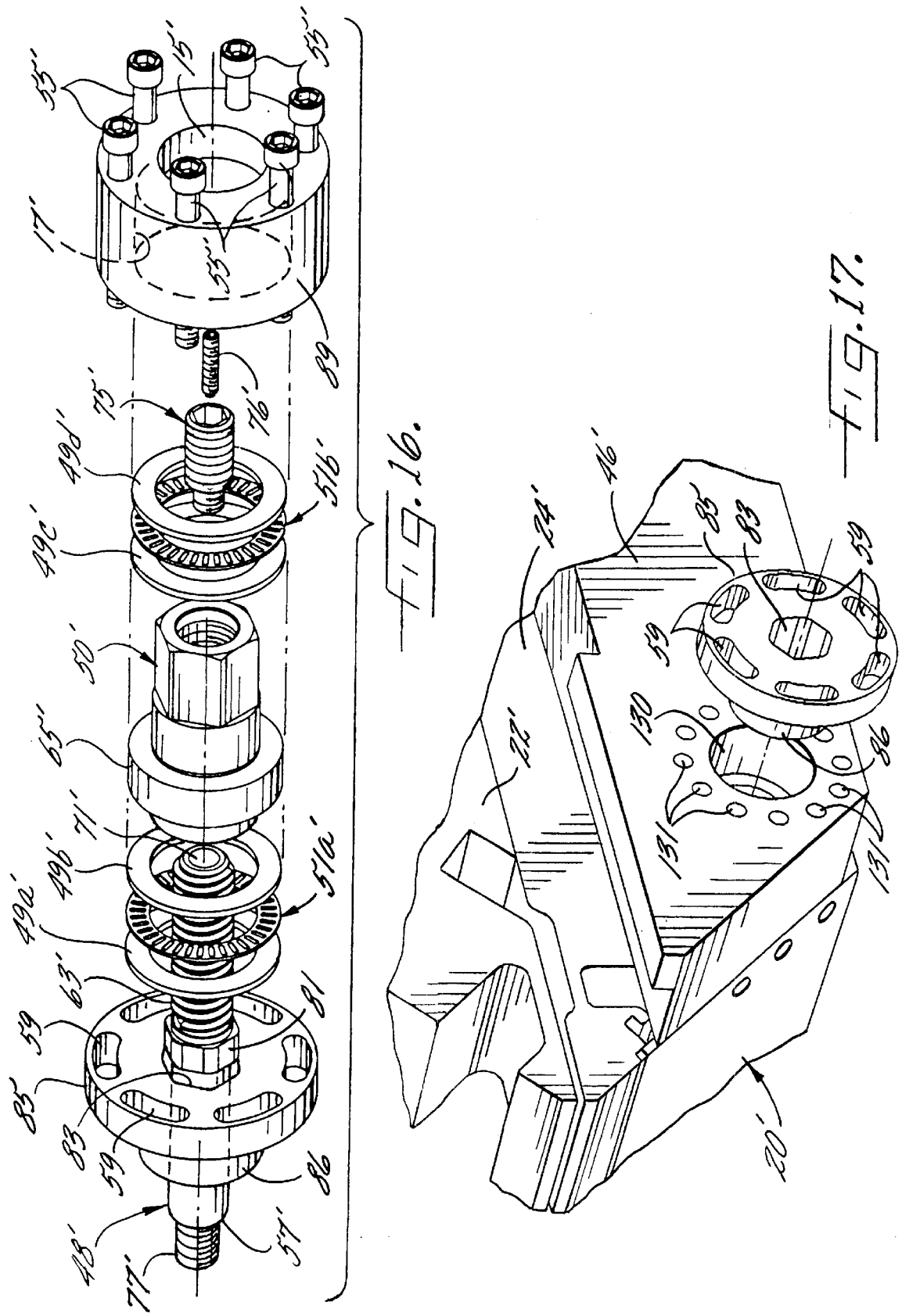

APPARATUS FOR ADJUSTING DIE LIP GAP

REFERENCE TO RELATED PATENT APPLICATION

This patent application claims the benefit of U.S. Provisional Patent Application Ser. No. 60/025,305, filed on Sep. 24, 1996 now abandoned.

BACKGROUND OF THE INVENTION

Flat sheet or film extrusion dies have been provided with various mechanical means for adjusting the die lip in order to provide a controlled film or sheet thickness. This has sometimes been accomplished by providing a flexible or slidable lip. It has been conventional to use a plurality of bolts spaced apart from each other along the lip to control the lip gap at a plurality of space points along the lip. Adjusting the individual lip bolts involves considerable skill, takes time and adds to the cost of production.

With sliding lips, damage can result to the lip and die body due to adjustment and/or interchanging of lips. Sliding lips are heavy and hard to handle, especially when heated. Many operators use "pry bars" to move the components which may cause damage.

Thermal expansion and contraction of lip-adjusting components may be used to adjust the lip opening, such as described in U.S. Pat. No. 3,940,221 to Nissel, U.S. Pat. No. 4,753,587 to Djordjevic, et al, and U.S. Pat. No. 5,208,047 to Cloeren, et al.

Certain conventional designs employ a movable upper lip portion along with a rigid or fixed lower lip portion. When the gap is adjusted by flexing an upper lip, a limited range of adjustment is possible, typically up to about 0.075 to 0.100 inches of adjustment. A sliding lip may be used to provide for a greater gap range; however, the adjustment or substitution of lips is time consuming. It is also difficult to measure the lip gap and then modify the gap by adjusting numerous bolts.

Convenient adjustment of the lip gap and accurate measurement of the adjustment are desired. However, convenient adjustability of the lip gap during extrusion is lacking in conventional designs, as is a convenient means for accurately measuring the gap.

Repeatable and precise adjustment are desired features. A smooth, non-jerking adjustment is beneficial. Repeatability at a later time would reduce set-up time.

An approach for adjusting the lip gap using an adjustable bottom lip, is illustrated by EP 668 143, published on Aug. 23, 1995, to Extrusion Dies, Inc. This approach uses a generally laterally movable angle block having one or more angled cam blocks extending therefrom, and a lip adjustment block coupled to the bottom lip and including one pr more angled grooves or recesses sized to closely receive the cam blocks for sliding movement therein. A threaded stud extends axially from one end of the angle block through a hole in an end plate and is received by a complementarily threaded spool. Rotation of the spool results in generally lateral movement of the angle block and in single point adjustment of the lip gap.

This approach is asserted to solve many problems of conventional dies. However, the lip adjustment block and the corresponding angle block are difficult to manufacture. Because the cam blocks of the angle block fit into the angled grooves of the block and the entire lengths must fit perfectly, accurate machining is required. This difficulty increases with increased length. Likewise, replacement and repair of these components is expensive and time consuming, and because of the interfit, it may be necessary to remove both components.

In addition, the lengths of the lip adjustment block and angle block cause other problems. A lengthy component may tend to warp, and because of thermal expansion and retraction, the possibility of warping is increased. Moreover, long pieces of sixty inches or more usually require greater machining clearance for the pieces to mate properly, which may result in non-uniformity along the die lip. Furthermore, rotation of the spool can be difficult if the long pieces do not properly fit and align. If so, costly oversized or special thread forms may be necessary.

The lip adjustment blocks are uncovered, and therefore molten material may flow onto the cam blocks and/or into the grooves of the lip adjustment block. As a result, interfit and/or movement of these parts may be hindered or prevented, and there may be greater stress, deformity, and opportunity for wear.

The lip adjustment blocks are secured by shoulder bolts to the die body. Elongated holes in the lip adjustment blocks permit movement of the blocks. When a block is adjusted, the head of the shoulder bolt experiences stress. The stress is focused on edges of the head and edges of the elongated holes, tending to wear the head and holes.

When used, externally attached deckles are attached to the movable lip adjustment blocks. However, because these blocks move up and down, interference with the deckle function and wear of the deckle and lip surfaces may result.

It is therefore an object of the present invention to provide an extrusion apparatus having single point adjustment for lip gap control across its full width, yet ease of manufacture.

It is a further object to provide an extrusion apparatus with an adjustable lip that moves smoothly, precisely, and with accurate repetition, and that provides for quick adjustments and does not interrupt the extrusion process.

It is a still further object to provide an extrusion apparatus with interfitting lip adjustment components that can be be easily interfit and move into alignment, easily manufactured, and are removable, interchangeable and replaceable.

It is an even further object to prevent material flow into and/or onto the lip adjustment components.

It is an additional object, when an external deckle is used, to mount the deckle so that movement of the lip adjustment components does not affect contact of the deckle with the exit slot.

It is another object to provide an extrusion apparatus having a single point adjustment for the lower lip and a single point adjustment for the upper lip.

It is yet another object to provide an improved method for profiling extruded flat sheet material.

Still further objects and advantages will become apparent from a consideration of the description and drawings.

In accordance with the invention, there is provided an extrusion apparatus including a flexible lip for adjusting the gap of the exit slot, a plurality of spaced apart, reciprocally movable members in operable contact with the flexible lip, and a generally laterally movable actuator bar connected with the reciprocally movable members by pin members. In accordance with the invention, the reciprocally movable members each include an angled slot, the actuator bar includes spaced apart bores, and the pin members include head portions engaged with the angled slots and shaft portions rotatably mounted in the actuator bar bores.

Also, there is provided an assembly for control of the reciprocally movable members and the actuator bar. The assembly beneficially includes a generally laterally disposed adjustment stud having an end engaged with the actuator bar and having a non-circular portion, and a locking member having a throughbore of a cross-sectional shape and size for preventing rotation of the adjustment stud.

In addition, in accordance with the invention, there is provided a method of profiling extruded flat sheet material using the foregoing extrusion apparatus. By the method, the lip gap is adjusted to a selected profile, and a material is extruded through the profiled lip gap. The lip gap profile is provided by at least one of the angled slots of other of the reciprocally movable members.

BRIEF DESCRIPTION OF THE DRAWINGS

FIG. 1 is a partial front elevation view of an extrusion apparatus in accordance with a preferred embodiment of the present invention;

FIG. 2 is a cross-sectional view of the extrusion apparatus taken along the line 2—2 of FIG. 1;

FIG. 3 is a partial front and bottom perspective view of the right hand side of the extrusion apparatus of FIG. 1.

FIG. 4 is a partial front and bottom perspective view of the opposite end of the extrusion apparatus of FIG. 1;

FIG. 5 is a partially exploded front perspective view of a preferred actuator means of the extrusion apparatus of FIG. 1, with parts removed;

FIG. 6 is a perspective view of a push/pull block of the actuator means of FIG. 5;

FIG. 7 is a partial perspective view of an actuator bar of the actuator means of FIG. 5, with some pins exploded for detail;

FIG. 9 is an exploded perspective view of components used for reciprocally moving the actuator bar, in the apparatus of FIG. 1;

FIG. 10 is a cross-sectional view similar to FIG. 2, illustrating mechanical means for measuring movement of the push/push blocks;

FIG. 16 is an exploded perspective view similar to FIG. 9, of components of the modified actuator means-controlling structure of FIG. 14; and FIG. 17 is an exploded perspective view of features seen in FIG. 15.

DETAILED DESCRIPTION OF PREFERRED EMBODIMENTS

Figure 8:
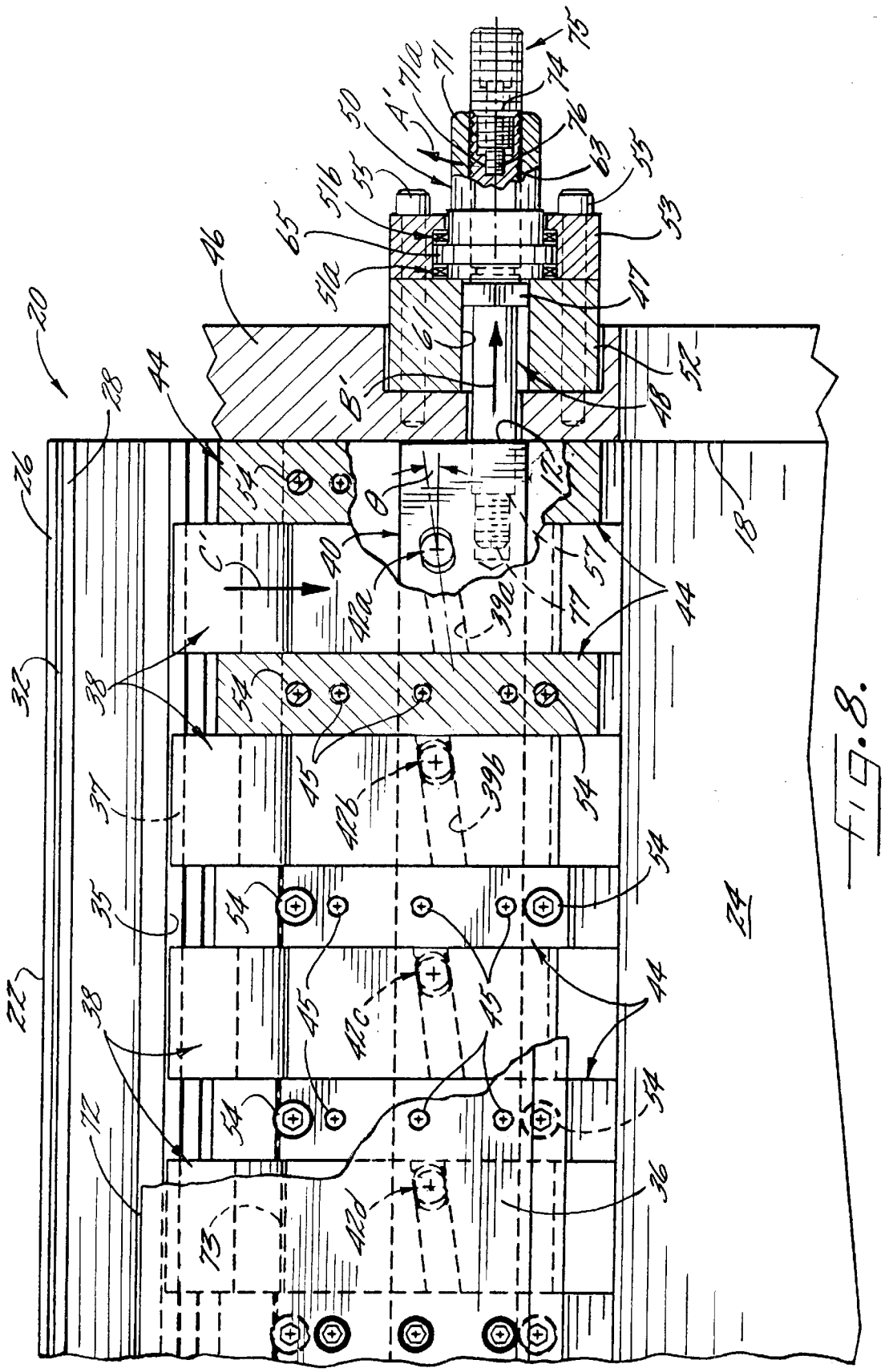
FIG. 8 is a partial front elevation view similar to FIG. 1, with portions cutaway and in section, showing the actuator bar pulled to the right hand side of the apparatus of FIG. 1.

As shown in FIGS. 1 to 4, extrusion die apparatus 20 has an upper body 22 and a lower body 24, and particularly referring to FIG. 2, the apparatus defines a flow passageway 33, which terminates in an exit slot 32 formed by lips 26 and 28. Plastic or other material flows through passageway 33 to exit at exit slot 32. Thermoplastic and other flowable materials including flowable food products may be extruded, and as needed, the plastic or other substance may be heated to flow through passageway 33. Lip 28 has a necked down portion defined by a recess 34, which allows flexibility of lip 28 for adjustably varying the thickness of exit slot 32, thereby controlling the thickness of the extruded product. Exit slot 32 extends along the width of the extrusion apparatus. It will be understood that instead of lip 28, lip 26 could be a flexible lip with which, as described below, an actuator means is in operable contact.

A cover plate 36 advantageously covers a plurality of push/pull blocks 38, and also covers a plurality of spacer mounts 44. As a result, push/pull blocks 38 and spacer mounts 44 are not exposed except from beneath as best seen in FIGS. 3 and 4. Because the push/pull blocks 38 and spacer mounts 44 are not exposed, extruded material is less likely to contact these components and therefore less likely to interfere with the smooth operation of the die apparatus.

Spacer mounts 44 separate push/pull blocks 38, and are attached to extrusion die 20, and in particular to lower body 24, by bolts 54. Conveniently, each spacer mount 44 is secured to lower body 24 by two bolts 54. Spacer mounts 44 define the areas in which push/pull blocks 38 are disposed, and resist lateral movement of push/pull blocks 38. Spacer mounts 44 also include apertures 45 for attachment of cover plate 36 to lower body 24 by bolts 56. An upper portion 2 of cover plate 36 beneficially is not fastened to the spacer mounts. This allows cover plate 36 to flex during movement of push/pull blocks 38.

Unlike spacer mounts 44, push/pull blocks 38 are not fastened to the die body; and in addition, push/pull blocks 38 are not fastened to spacer mounts 44 or to cover plate 36. Nevertheless, as mentioned, spacer mounts 44 inhibit side to side or lateral movement of push/pull blocks 38, and function to hold push/pull blocks 38 in place. Cover plate 36 also functions to hold push/pull blocks 38 in place. Cover plate 36 prevents push/pull blocks 38 from popping out of position during operation. In this way, push/pull blocks 38 are held in place, yet can move up and down or vertically within the spaces or pockets defined by spacer mounts 44 and cover plate 36. As described below, push/pull blocks 38 push or pull on lower lip 28, to flex lower lip 28. Other holding means may include structure that inhibits vertical movement, yet allows lateral movement. Other holding means may include clamps, pins, screws, sleeves, pockets, guides, or other structures for positioning the push/pull blocks 38.

As best shown in FIGS. 5 and 6, push/pull blocks 38 each include an angled slot 39. Slots 39 are provided at an angle θ, defined in FIG. 6 as the angle between a lower face 3 of slot 39 and a broken line L. The angle θ is also depicted in FIGS. 1, 5 and 7, and can be understood to be the angle of deviation from a generally horizontal position. Although the inventor has not conducted detailed testing of the range of workable slot angles, it is believed that a workable range for the slot angle is between 5 and 15 degrees. In this regard, the slot angle may vary, for example, according to the thickness of the neck defined by recess 34. If the neck is narrow, i.e., if there is little thickness, then lip 28 tends to flex relatively more easily, and the angle may be relatively greater. On the other hand, when the neck is relatively thicker, the angle will typically be relatively less. As the angle becomes relatively greater, the flex area may need to change in shape as well as thickness.

An operator may control the amount of flex by using push/pull blocks having slot angles of varying degrees. The inventor has found that the preferable slot angle is between 6 and 9 degrees. An angle of lesser degree produces a range of flex or gap control that is relatively smaller than a range produced by an angle of greater degree. An operator may therefore vary the range of flex or gap control by selecting push/pull blocks having the desired slot angle.

If desired, slots 39 may be cut with a reverse angle. For instance, instead of sloping down from left to right as shown in FIG. 6, slots 39 may be cut to slope down from right to left. Reversing the slot angle reverses the directional movement of push/pull blocks 38. As will become understood, whether slots 39 slope from left to right or from right to left, affects whether an actuator bar 40 is pushed or pulled to close or open the lip gap.

Also with reference to FIGS. 1 to 4, push/pull blocks 38 each beneficially include a finger 37 defined by a recess 4 (numbered in FIG. 6), for insertion into a groove 35 of lower lip 28. Groove 35 runs the width of the lower lip. Groove 35 accommodates a plurality of fingers 37 so that a plurality of push/pull blocks 38 may be utilized. Because of fingers 37, blocks 38 can exert both "push" and "pull" actions on lower lip 28. However, as explained later, "push only" lip adjustment members may be used.

Referring particularly to FIG. 6, blocks 38 each have a stepped outer surface which includes an outer surface 5 stepped down from an outer surface 6 disposed opposite to recess 4, which defines finger 37. In like manner, referring particularly to FIG. 2, cover plate 36 has a stepped inner surface which includes an inner surface 7 which covers outer surface 6, and a raised inner surface 8 which covers stepped down outer surface 5 of blocks 38. Likewise, as best shown in FIGS. 3 to 5, spacer mounts 44 have a stepped outer surface similar to that of blocks 38. When upper portion 2 of the cover plate is fastened by fasteners 66 (only one shown) to mounting blocks 44 (only one shown) as shown in the FIG. 12, inner surface 7 of upper portion 2 may be beneficially channeled so as to be provided with a plurality of channels or recesses disposed over push/pull blocks 38 for facilitating up and down movement of blocks 38. However, even in the absence of the channeling and with reference to FIG. 12, upper portion 2 flexes between fasteners 66 for the upper portion and exit slot 32.

Referring again to FIG. 2, upper portion 2 of the cover plate extends beyond fingers 37 of push/pull blocks 38 and into contact with lower lip 28. As seen in the Figure, the extension of the cover plate is seated in a recess in the lower lip, and an exterior gap 72 is provided between an end 9 of the extension and an opposing face of the recess. Similarly, an interior gap 73 is provided between a face 10 of the cover plate and an opposing face of push/pull block 38. Gaps 72,73 widen as the push/pull blocks 38 are moved in direction C. Gaps 72,73 narrow when the push/pull blocks 38 are moved directionally opposite to direction C.

In accordance with the invention, as shown best in FIGS. 1, 5 and 8, each push/pull block 38 receives a pin 42 at an angled slot 39. FIG. 1 illustrates pins 42*a–e* matched with, and inserted into, corresponding angled slots 39 of push/pull blocks 38. Referring also to FIG. 7, pins 42 include head portions 60 removably insertable into angled slots 39, and shaft portions 67 removably insertable into smooth bores 41 of actuator bar 40. Preferably, head portions 60 are elongated with opposing parallel surfaces and opposing radial surfaces, as shown in FIG. 7, and shafts 67 are round and rotatably engaged in bores 41 spaced along the length of actuator bar 40 to accommodate for different angles of angled slots 39. Rotatable engagement facilitates insertion of elongated heads 60 of pins 42 into angled slots 39. FIG. 7 illustrates rotation of pins 42*a–b* in a counterclockwise direction D, until the angle θ is reached as illustrated for pin 42*c*. Thus, pins 42 are rotatably engaged in actuator bar 40 for positioning of heads 60 at the angle θ or another suitable angle that corresponds to the angle of slots 39. As a result, connection of push/pull blocks 38 with generally laterally sliding actuator bar 40 is facilitated. To use a push/pull block having an angled slot of a greater or lesser angle than θ, the operator simply rotates the corresponding angle pin to match the different angle. There is no need to machine a new actuator bar, or to modify components of the actuator bar. However, in certain applications, it may be beneficial for pins 42 to be fixed to, and non-rotatably connected with, actuator bar 40.

As indicated, heads 60 insert into angled slots 39 for movement within the slots. By using an elongated head instead of a rounded head, a greater surface area of contact between pins 42 and angled slots 39 is provided, and as shown in FIGS. 1, 5 and 8, opposing flat surfaces of heads 60 provide the contact with angled slots 39. Use of an elongated head instead of a round head also reduces wear on slots 39 because forces are distributed over the greater contact surface area resulting from the flat surfaces of the elongated head. However, using a rounded head instead of an elongated head, would reduce the need to orient the head to the angle of the angled slot 39. Pins 42 may vary in size, to be of greater or smaller size, without modifying the actuator bar 40 or push/pull blocks 38 other than by modifying angled slots 39 and bores 41 of activator bar. A relatively larger pin 42 can handle more force in high pressure applications.

Pins 42 are preferably made from or treated with a low friction material. A low friction material such as Aluminum Bronze is preferred for reducing friction which can enhance the ease of operation without jeopardizing durability.

Upon removing cover plate 36, push/pull blocks 38 are exposed, yet remain in position because of being held in place by groove 35, spacer mounts 44, and pins 42. Blocks 38 also contact die body 24. With the plate removed, individual blocks 38 may be removed and replaced. If necessary, a screwdriver or pry tool may be used to assist the removal of individual blocks 38. To this end, the push/pull blocks preferably each include a screwdriver slot 58, shown best in FIGS. 2 and 6.

With continued reference to FIG. 2 in particular, actuator bar 40 is situated in a generally laterally disposed recess in lower body 24, which allows for generally lateral, but not vertical movement, of bar 40. Generally lateral movement of the actuator bar in the recess causes push/pull blocks 38 to move generally perpendicularly to close or open lip gap 32, depending upon the direction of the generally lateral movement. As best shown in FIGS. 5, 7 and 8, an adjustment stud 48 connects to an end of the actuator bar to effect the generally lateral movement; and referring particularly to FIG. 8, a threaded bore 43 in the end of the actuator bar receives a threaded end 77 of adjustment stud 48 to provide the connection.

A variety of means for moving actuator bar 40 and push/pull blocks 38 may be employed, including jactuator mechanisms for pushing or pulling actuator bar 40, jack screws, ratchet mechanisms, cranks, pneumatic or hydraulic cylinders, gearmotors, thermal expansion rods, or motorized arms. Such means may be single point adjusting means, or means that are activated from a single point. Other means to reciprocally move the actuator bar may include features using threaded components or other locking and sliding mechanisms.

With reference particularly to FIGS. 8 and 9, a preferred structure for moving actuator bar 40 and push/pull blocks 38 is shown. As noted, threaded end 77 of adjustment stud 48 connects adjustment stud 48 with actuator bar 40; and in addition, adjustment stud 48 passes through an appropriately sized opening in side plate 46 for connection with other components as described. A smooth or unthreaded portion of adjustment stud 48 is of larger diameter than threaded end 77 and terminates in a shoulder 57, which is suitably seated within bore 43 of actuator bar 40.

A nut portion 47 is integrally connected to adjustment stud 48, and surrounds a portion of the adjustment stud located between threaded end 77 and an opposite threaded end 63. Nut 47 may have a variety of non-circular shapes, including but not limited to a square, as depicted, or a hexagon. A locking block 52 includes a throughbore 61 suitably configured to be of the same cross-sectional shape as nut 47, and sized to receive nut 47 and allow adjustment stud 48 and nut 47 to freely reciprocally move within locking block 52, yet prevent nut 47 from rotating within bore 61. Bore 61 extends through locking block 52, conveniently through the center portion; and adjustment stud 48, in particular nut 47 of adjustment stud 48, is inserted into, and disposed within, nut receiving throughbore 61 to prevent rotation of adjustment stud 48.

An adjustment nut 50 includes a threaded interior bore, best shown in FIG. 8, for engaging a threaded end 63 of adjustment stud 48 disposed opposite to end 77 and separated from end 77 by nut 47. Thrust needle roller bearings 51a and 51b, sandwiched between thrust washers 49a, 49b and 49c, 49d, respectively, are positioned on each side of a flange 65 of adjustment nut 50. A retaining plate 53 includes a bore 15, conveniently centrally located, through which the adjustment end of adjustment nut 50 projects and an appropriately shaped recess 17 which receives and fits over flange 65 of adjustment nut 50 and washers 49 and bearings 51. Side plate 46 includes a shaped recess for receiving locking block 52; and bolts 55 pass through peripherally located bores in retaining plate 53 and aligned peripherally located bores in locking block 52, and are threaded into threaded bores in plate 46, to secure the actuator means-controlling mechanism to side plate 46. In this way, locking block 52 is mounted for preventing rotation of nut 47 and of adjustment stud 48, and hence unthreading of stud 48 from actuator bar 40.

Thrust needle roller bearings 51 can be used on short length dies where the internal pressure placed on the bearings is not great. However, most dies will require use of "washer type" thrust bearings in place of needle roller bearings 51. Thrust needle roller bearings 51 contain small rollers (not shown) which circle the face of the bearing and fan outward from the center point of the bearing. A washer type bearing can be made of a slippery material and sandwiched between thrust washers 49. The washers may then be lubricated. While a washer type of thrust bearing may not turn as easily as a needle type of bearing, the washer type will not crush. Washer type bearings can be made of hardened or low friction material, and can be purchased or fabricated to suit the needs of the user.

When adjustment nut 50 is rotated, the extent of threaded end 63 of adjustment stud 48 within the threaded bore of adjustment nut 50, increases or decreases and this moves nut 47 in like direction within locking block 52. This generally lateral movement of adjustment stud 48 moves actuator bar 40 in like direction so as to move push/pull blocks 38 generally perpendicular to the generally lateral movement to adjust the flexible lip 28, with the direction of movement of lip 28 depending upon the direction of rotation of adjustment nut 50. As indicated in FIG. 1, counterclockwise rotation of adjustment nut 50 in a direction A extends adjustment stud 48 in a direction B and causes push/pull blocks 38 to move up in direction C, reducing the lip gap; whereas as indicated in FIG. 8, clockwise rotation of adjustment nut 50 in a direction A' retracts adjustment stud 48 in a direction B' and causes push/pull blocks 38 to move down in a direction C', increasing the lip gap. Adjustment stud 48 maintains position until adjustment nut 50 is further rotated.

With continued reference to FIG. 8, when pulled generally laterally, actuator bar 40 will stop travel when its face 12 abuts a face 18 of side plate 46. Beneficially, this abutment occurs before pins 42 abut spacer mounts 44, and as a result, this eliminates side force on pins 42. If desired, however, actuator bar 40 can be sized so that actuator bar 40 and pins 42 abut movement limiting structures at the same time. Similarly, when actuator bar 40 is pushed generally laterally, actuator bar 40 may abut a like plate positioned opposite to side plate 46, and this abutment will advantageously occur prior to abutment of pins 42 with spacer mounts 44 so that side force on pins 42 is also eliminated in this instance. Also if desired, a stop member can be attached to an end of actuator bar 40 so that contact of the stop member with face 12 limits the lateral movement of the actuator bar.

Because a die apparatus is internally pressurized to pass material through the flow passage way 33, a relatively large amount of force must be applied to actuator bar 40 to reduce the lip gap opening. Beneficially, the inventive structure pushes, as opposed to pulls, actuator bar 40 to close lip gap 32. When an operator rotates adjustment nut 50 in counterclockwise direction A, as shown in FIG. 1, an adjustment stud shoulder 57 bears upon actuator bar 40; whereas, when adjustment nut 50 is rotated in opposite clockwise direction A' shown in FIG. 8, the securing threads of end 77 bear the lateral force. Push/pull blocks 38 with angled slots 39 which slant as shown in FIG. 6, function to close the lip gap when shoulder 57 pushes on actuator bar 40. If angled slots 39 were slanted in a direction opposite to that shown in FIG. 6, securing threads 77 would bear the lateral force exerted to close lip gap 32. If desired, push/pull blocks 38 can be easily changed so that rotation of adjustment nut 50 in clockwise direction A', closes the lip gap 32. Shoulder 57 reduces "slop" or "backlash" which would otherwise result from the threading of adjustment stud 48 into actuator bar 40. The result is better calibration when changing the direction of rotation of adjustment nut 50. Adjustment nut 50 and other actuator means-controlling components may, of course, be on the other side of the apparatus.

Thrust bearings 51a–b reduce the rotational friction between adjustment nut 50 and locking block 52, and between adjustment nut 50 and retaining plate 53. Use of thrust bearings 51 results in easy and smooth adjustment which leads to better repeatability and accuracy.

In some instances when internal pressures become great, an extruder feeding product to the apparatus must be shut off or idled down to reduce pressure at the die lips so that the lip gap can be reduced. Heavy duty thrust bearings may be used to accommodate operation without reduction of the extruder pressure, but the inventor has found such bearings to be very large and unworkable. An operator may use thrust bearings 51 in conjunction with reduction of extruder pressure, to accommodate for closing of lip gap 32. Opening of lip gap 32 is not problematic since internal pressures assist lip gap widening.

Rotation of adjustment nut 50 in counterclockwise direction A as shown in FIG. 1, moves nut 47 generally laterally within locking block 52 to cause shoulder 57 to push actuator bar 40, which in turn causes actuator bar 40 to slide in direction B as shown. When sliding actuator bar 40 moves generally laterally in direction B, push/pull blocks 38 are forced generally perpendicularly in direction C. This force pushes fingers 37 upward on groove 35 which in turn causes lip 28 to flex upward. Upward flexing of lip 28 causes lip gap 32 to be reduced. Rotation of adjustment nut 50 results in simultaneous adjustment of all push/pull blocks 38 along the entire lip width, thus resulting in uniform flex of lip 28. The selected position of lip 28 is maintained until adjustment nut 50 is adjusted further.

Referring to FIG. 8, when adjustment nut 50 is rotated in opposite clockwise direction A', reverse forces cause push/pull blocks 38 to pull on lower lip 28 and lip gap 32 to increase. Thus, depending upon whether adjustment nut 50 is rotated counterclockwise or clockwise, push/pull blocks 38 either push or pull lip 28 to reduce or increase lip gap 32, respectively. If desired, the threading can be reversed for reverse operation. For instance, a user may wish to rotate adjustment nut 50 in direction A to cause the widen 32 to lip gap. In such case, the threads and angles can be reversed, i.e., manufactured to be either right-handed or left-handed threads.

An operator may select a variety of angles for the angled slots 39, and to this end, selectively replace certain push/push blocks. This allows an operator further control and options for adjustment of the lip gap. If desired, an operator may select an array of push/pull blocks 38 that have different angled slots 39, and in so doing, may mix and match to preference. For instance, the operator may select a particular array for profiling, for example, to create a "smile" or "frown" profile of lip gap 32. If desired, push/pull blocks with angled slots of 8 or 9 degrees at the end locations of the gap opening, could be combined with push/pull blocks with angled slots of 6 or 7 degrees through the intermediate location. Additionally, an array of push/pull blocks with different angled slots may be used to provide a uniform gap width in the case of variability in an otherwise uniform gap opening. An array can comprise any variation of angled slots that the operator may choose.

As indicated in the drawing, extrusion die 20 includes a plurality of push/pull blocks 38 spaced apart by spacer mounts 44 along its width. Push/pull blocks 38 exert force on lip 28 at multiple locations along groove 35, which also runs the width of extrusion die 20, to provide an adjustment of the exit slot along the entire slot width, in response to rotation of adjustment nut 50. Thus, by the present invention, a single adjustment point is beneficially used.

With continued reference to FIGS. 8 and 9 in particular, measuring indicator 75 includes a plurality of circular graduations 74 on a portion of its exterior peripheral surface and extends from adjustment nut 50. Indicator 75 includes a threaded male end for engagement with a threaded bore 71 of end 63 of adjustment stud 48. The threaded male end is of smaller diameter than the graduation-bearing portion of indicator 75. Indicator 75 moves with end 63 of adjustment stud 48, and therefore, as the extent of end 63 within adjustment nut 50 increases or decreases, the number of exposed graduations increases or decreases. An operator may therefore determine the movement of adjustment stud 48 by observation of the number of exposed graduations 74. Indicator 75 can be easily adjusted by rotation, so that a calibration mark 74, preferably designated as "o", shown in FIG. 3, is aligned flush with the adjustment nut 50 when lip gap 32 is in a free state position. After indicator 75 is calibrated, a calibration set screw 76, which is threaded through a bore in indicator 75, is bottomed into threaded bore 71*a* in end 63 of adjustment stud 48, to lock indicator 75 into position. To recalibrate, set screw 76 can be loosened and indicator 75 can be rotated for readjustment.

The inventive apparatus may include a mechanical measurement indicator 78 shown in FIG. 10, for indicating push/pull block movement. Indicator 78 has a face scale 79, which indicates the amount of movement of indicator arm 80, which conveniently abuts push/pull block 38. A plurality of indicators 78 may be employed along the width of the apparatus. Face scale 79 is beneficially calibrated to correspond to an actual gap opening at exit slot 32. As indicated in phantom in FIG. 10, the needle of the face scale will move in one direction as the lip gap is decreased and in the opposite direction as the lip gap is increased. Instead of a mechanical measurement indicator, an electrical measurement indicator such as a linear transducer, may be used.

Figure 11:
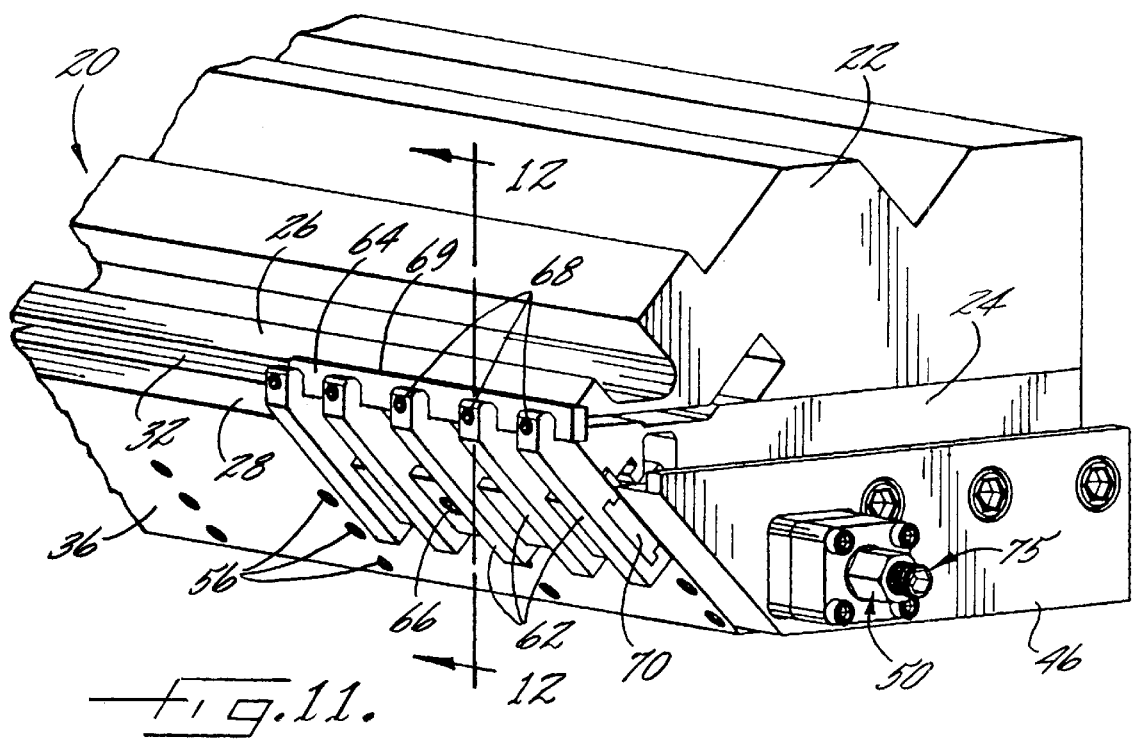
FIG. 11 is a partial perspective view of an extrusion apparatus in accordance with the present invention, with an external deckle attached to the right side of the exit slot.
Figure 12:
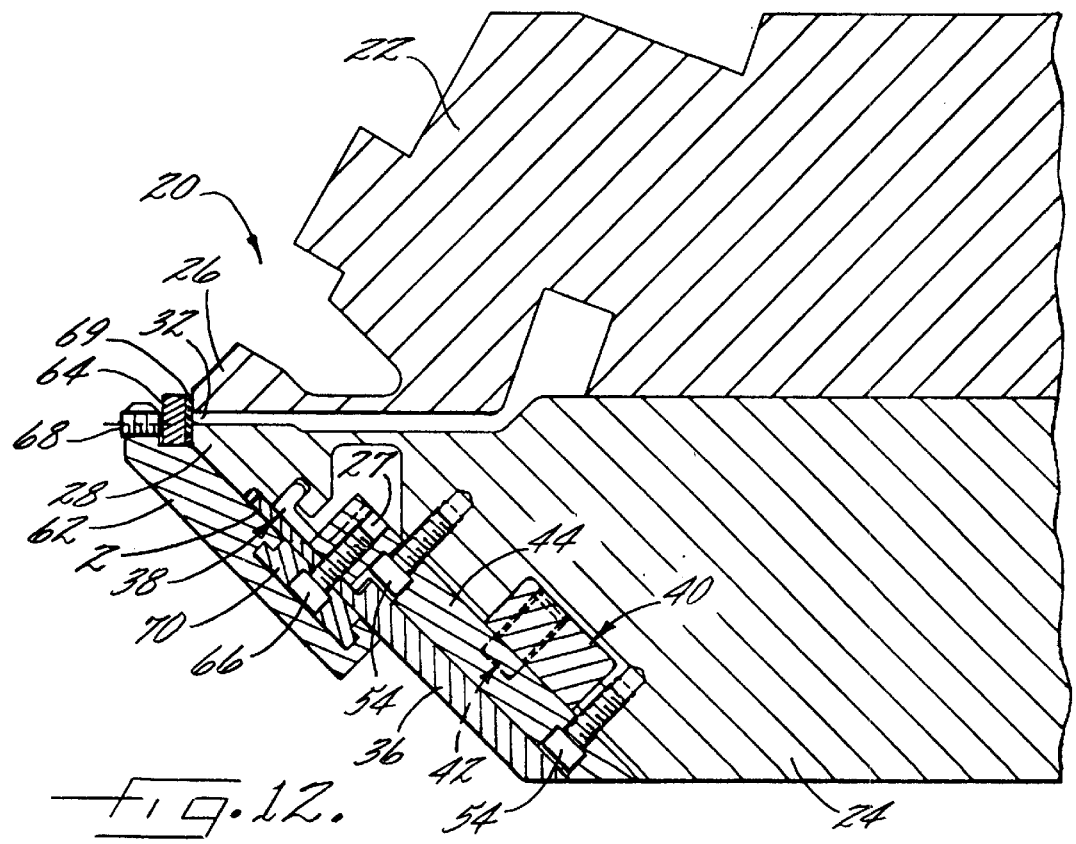
FIG. 12 is a cross-sectional view taken along the line 12—12 of FIG. 11.

With reference to FIGS. 11 and 12, an external deckling bar 64, if desired, may be used. Deckling bar 64 includes a conventional sealing strip 69, typically a fiber/resin composite, which abuts or covers exit slot 32 to dam off a portion of the gap opening 32. To hold deckling bar 64 in place, a T-bar 70 is attached to spacer mounts 44 by threaded T-bar bolts 66, which each pass through an access hole in an upper portion 2 of cover plate 36 and into threads of deckle tapped holes 27 (only one shown) of spacer mounts 44. The length of T-bar 70, the particular spacer mounts to be used to secure the T-bar, and the number of spacer mounts to be used, are determined by the width of the exit slot to be covered by deckling bar 64. Because T-bar 70 is secured to spacer mounts, any interference with operation of the push/pull blocks 38 and of deckling bar 64 is reduced. Deckling blocks 62, which include set screws 68 for securing deckle bar 64 into position and against lips 26 and 28, are engaged by, and held in place by, T-bar 70. The number of deckle blocks 62 to be used, will vary according to the extent of the exit slot 32 to be deckled. A recess in each of deckle blocks 62 receives deckle bar 64. A variety of sizes and designs of deckling may be used including varieties known as Bolt-on Block Off, Yoke, Adjustable Cantilever Wedge Type, and Adjustable Power Wedge Type.

As push/pull blocks 38 are adjusted, deckling bar 64 beneficially maintains a constant seal over the gap and is not subject to tipping or buckling due to adjustment of the lip gap. A user may therefore adjust the lip gap without concern of disrupting deckling bar 64.

Figure 13:
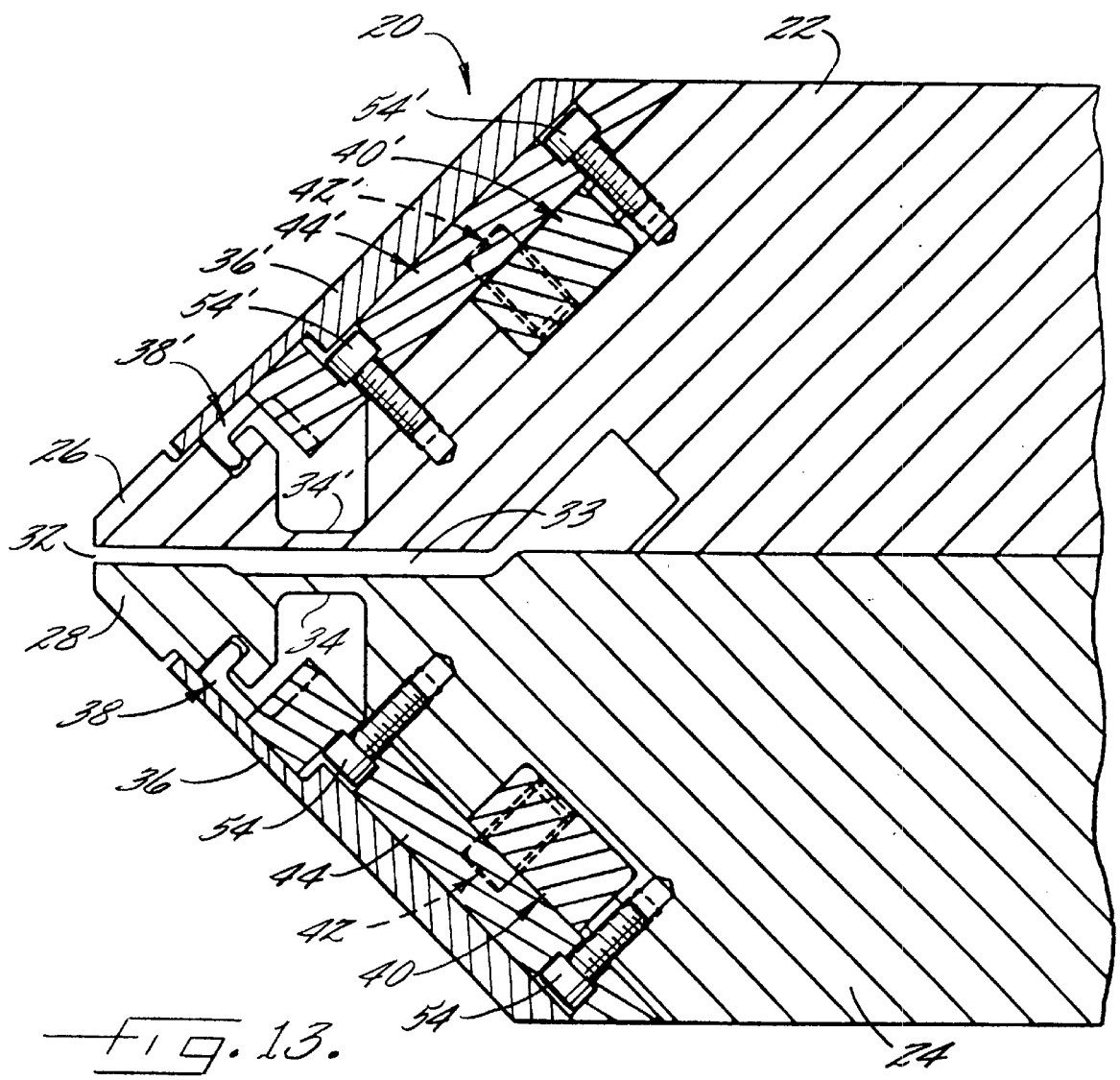
FIG. 13 is a cross-sectional view of an extrusion apparatus in accordance with the present invention, which includes adjustment means for both upper and lower flexible lips.

Referring to FIG. 13, in a further embodiment of the present invention, upper flex lip 26 is made adjustable by use of use the lip-adjustment structure described earlier. Like numbers with the prime notation added, are used in the Figure to designate like parts or structure. This variation allows even greater control over the gap opening, and profiling ability is increased since both the upper lip and lower lip may be adjusted.

Referring now to FIGS. 14–17, an alternative preferred actuator means-controlling structure, is shown. Like numbers with the prime notation added, are used in these Figures to designate like parts or structure. An adjustment stud 48' includes an integrally connected nut 81, which advantageously has more than four sides, in place of square nut 47.

Beneficially, nut 81 is hexagonal, as shown. A locking member 85 includes a nut receiving throughbore 83 suitably configured to be of the same cross-sectional shape as hexagonal nut 81. Shaped nut receiving bore 83 extends through locking member 85, conveniently through the center portion. Locking member 85 has a generally cylindrical shape, and includes a generally cylindrical tail portion 86 of reduced diameter for seating locking member 85 into a mating generally cylindrical recess 130 in a side plate 46'. Locking member 85 beneficially includes a plurality of radially elongated slots 59 for a plurality of retaining bolts 55' for securing the actuator means-controlling mechanism to side plate 461. As in the embodiment of FIG. 1, nut 81 and a threaded end 63' of adjustment stud 48' beneficially project exterior to the side plate for alignment with and connection to other components.

Whereas square nut 47 requires a 90 degree rotation increment for insertion into square nut receiving throughbore 61 of locking block 52, hexagonal nut 81 advantageously needs a lesser degree of rotation for alignment with, and insertion into, hexagonal nut receiving throughbore 83. Locking member 85 includes six generally equally spaced apart, radially elongated slots 59 for bolts 55'. The radially elongated slots facilitate alignment of bolts 55' with a plurality of threaded bores 131 in side plate 46' for receiving bolts 55'. Bores 131 are circumferentially disposed around recess 130, as shown in FIG. 17. The radius of each alignment slot 59 advantageously provides for approximately 30 degrees of alignment adjustment.

Figure 15:
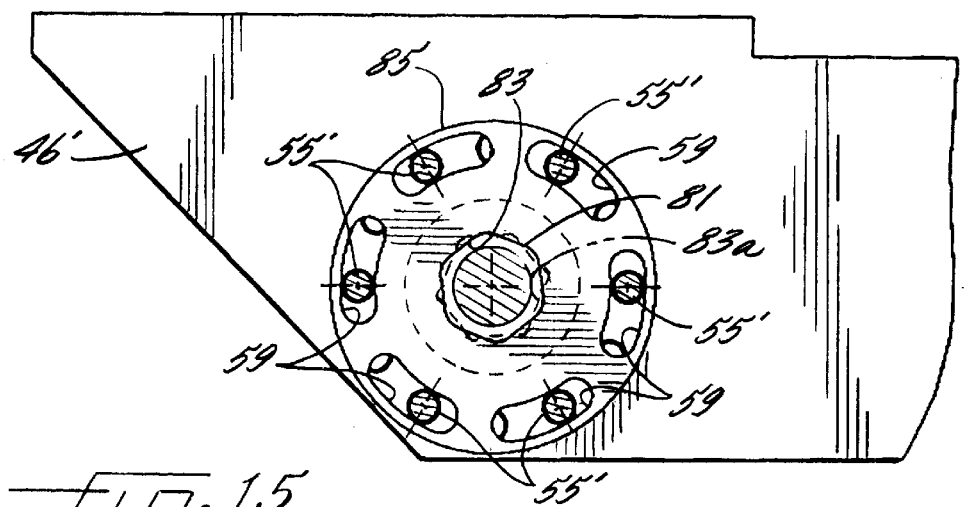
FIG. 15 is a cross-sectional view taken along the line 15—15 of FIG. 14.

In assembly, adjustment stud 48' and in particular hexagonal nut 81, are inserted into receiving throughbore 83 of locking member 85, and generally cylindrical tail portion 86 of locking member 85 is disposed within mating recess 130 of side plate 46'. Because alignment slots 59 provide for approximately 30 degrees of adjustment, slots 59 may thereafter be conveniently aligned with bores 131 in side plate 46', as indicated in FIG. 15. After threaded end 63' of adjustment stud 48' is threaded into adjustment nut 50', a generally cylindrical retaining plate 89 is placed over flange 65' of adjustment nut 50'; bolts 55' are passed through the peripherally located bores of retaining plate 89, and through alignment slots 59 of locking member 85; retaining plate 89 is rotated until bolts 55' are in alignment with bores 131 in side plate 46'; and bolts 55' are threaded into bores 131. In this way, as in the embodiment of FIG. 1, the nut and adjustment stud are prevented from rotating, the adjustment stud is thereby prevented from unthreading from the actuator bar, and generally lateral movement of the actuator bar is provided for.

Figure 14:
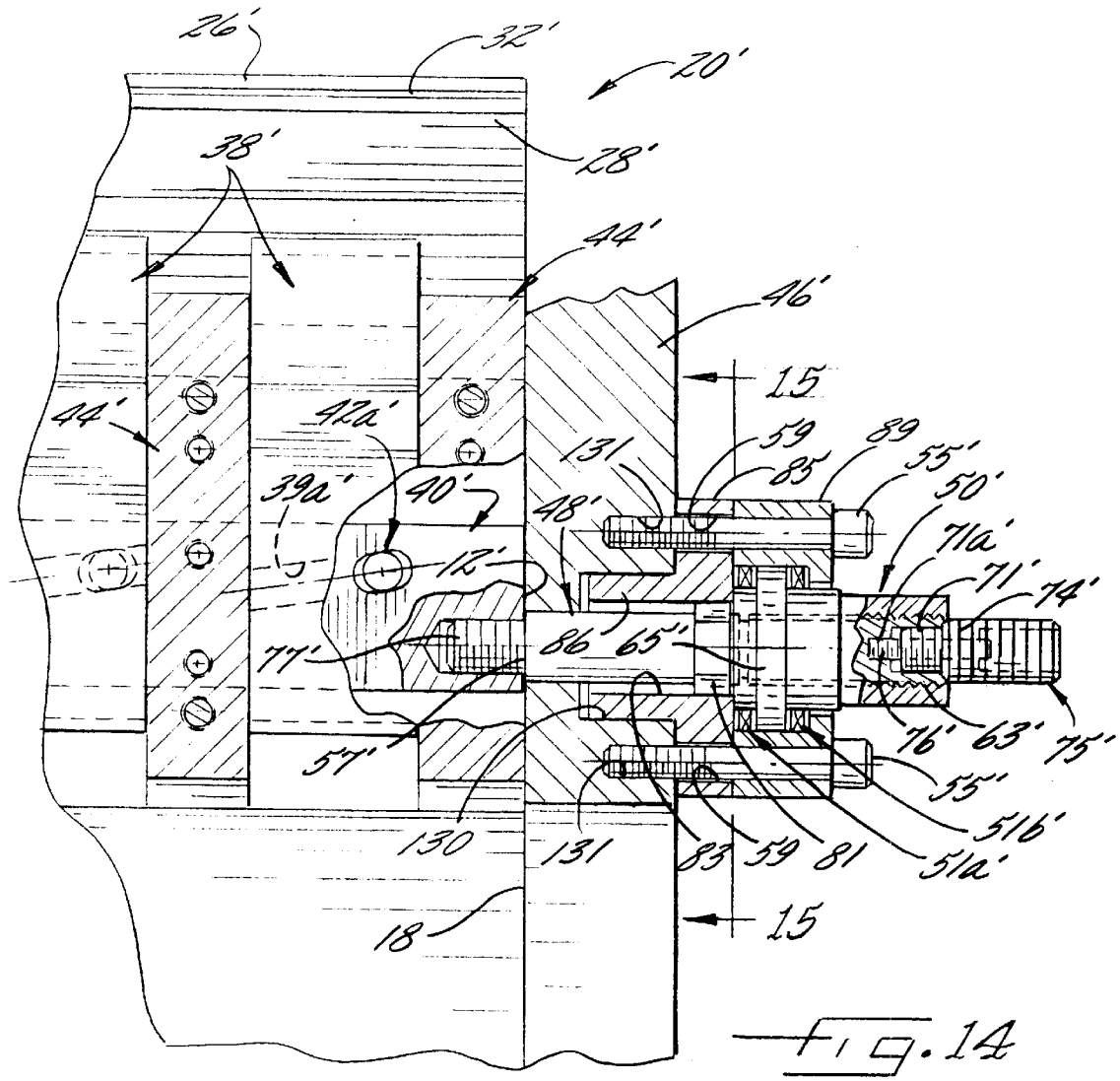
FIG. 14 is a partial front elevation view similar to FIG. 8 of an extrusion apparatus in accordance with the present invention, which has a modified structure for controlling the actuator means.

As shown in FIG. 14, face 12' of actuator bar 40' abuts adjustment stud 48' at shoulder 57'. This provides solid contact between the actuator bar and the adjustment stud so that lateral force may be efficiently transferred from the adjustment stud to the actuator bar. If there is not solid contact, then the lateral force acts upon the engaged threads of the actuator bar bore and end 77' of the adjustment stud, and there is a tendency for loose connection. This loose connection is sometimes referred to as "slop", "play" or "back-lash". Therefore, as in the embodiment of FIG. 1, "slop", "play" or "back-lash" is eliminated. Push/pull blocks 38' with angled slots 39' which slant as shown in FIG. 14, function to close lip gap 32' when shoulder 57' pushes on actuator bar 40'.

The plurality of bores 131 in side plate 46' accommodate convenient alignment. Relatively more bores 131 are better for this purpose than relatively fewer bores 131. As indicated in FIG. 17, twelve bores 131 generally equidistantly spaced apart, are advantageous. Use of multiple bores 131 in combination with radially elongated slots 59 greatly improves the likelihood that nut 81 will line up with nut receiving bore 83 and that slots 59 will be in alignment with bores 131; otherwise, adjustment stud 48' could be rotated sufficiently to rotate nut 81 for proper alignment with nut receiving bore 83. However, separation of shoulder 57' from actuator bar 40' is disadvantageous because of undesired back-lash or slopping. Even so, if rotation of an adjustment stud for orientation of the nut or for some other purpose like removal and replacement of the adjustment stud, is desired, the nut is beneficially positioned, as previously indicated, exterior to the side plate and within the locking member. Thus, when the locking member is removed, the nut is accessible and may be rotated.

A more desirable alternative is a plurality of locking members 85, which differ from one another in the relative orientation of nut receiving bore 83 to slots 59, as illustrated in FIG. 15, which depicts in dashed line an alternatively oriented bore 83a. Accordingly, if the bore 83/slots 59 orientation of one of the plurality of locking members 85 does not provide alignment, a different locking member 85 may be tried. Absent an alternative locking member 85, to maintain the adjustment stud shoulder in contact with the actuator bar face, a user may have to shave down the shoulder an appropriate amount so that the nut may be aligned with the nut receiving bore.

In a variation of the present invention, a plurality of push only members in operable contact with the flexible lip, are used in place of push/pull blocks 38. Use of push only members avoids lateral force applied to adjustment stud threads during a "pull" mode as in the embodiment of FIG. 1. The internal pressures of the apparatus and natural elasticity of the flexible lip will assist in widening the lip gap when the push only members are retracted.

Yet a further aspect of the present invention includes a method of profiling extruded flat sheet material. The method includes adjusting the lip gap to a selected profile by use of an extrusion apparatus including a first body portion and a second body portion each associated with a lip forming an exit slot of a flow passageway, wherein one of the lips is flexible for adjusting the gap of the exit slot; and means for adjusting the gap, and including a plurality of spaced apart, reciprocally movable members each including an angled slot and in operable contact with the flexible lip at a plurality of locations, the plurality of reciprocally movable members being characterized in that at least one of the movable members has an angled slot disposed at a different angle than the angled slots of other of the movable members; and extruding a material through the profiled lip gap.

From the foregoing description, a number of advantages of the adjustable extrusion die become evident:

Adjustment of the gap of the exit slot by flex of the flexible lip may be accomplished at a single adjustment point. The present invention provides for quick adjustment. Extrusion need not be interrupted to make adjustment to the lip gap.

Use of a plurality of lip adjustment members eliminates problems associated with a one-piece push/pull block. Furthermore, the range of adjustment of the lip gap can be varied by substituting lip adjustment members with different slot angles. For instance, a 6 degree angle produces total range movement of 0.210 inches; whereas, a 7 degree angle produces total range movement of 0.246 inches. Use of a greater angle results in a greater range of adjustment.

Reduced force is needed to rotate the adjustment nut, because of the free floating pin components and the floating reciprocally movable blocks. As explained, the blocks are not bolted to the apparatus. In addition, the time to make an adjustment is reduced. Moreover, use of thrust bearings assists the ease of rotation and allows for fast and consistent operation. Ease of adjustment allows a user to smoothly rotate the adjustment nut, which reduces jerking or staggered movement. Smooth adjustment assists return to a prior setting with precision.

A plurality of reciprocally movable blocks allows for ease of assembly. Because the blocks are not bolted to the apparatus and therefore allowed to float, they settle into their own natural alignment. This lessens the need to machine an exact fit. The blocks will settle into a suitable fit.

The pins are advantageously a plurality of small pieces. Thus, they can be easily precision machined and hardened for durability. The pins are free to rotate and settle into alignment within the angled slots of the reciprocally movable blocks.

The reciprocally movable blocks and cover plate can be made of dissimilar and hardenable material to reduce "galling."

A sixty inch die will grow in length by approximately 0.19 inches when heated to 450 degrees fahrenheit. If all of the mated pieces do not expand at the same rate, it is difficult to avoid interference problems. The use of a plurality of reciprocally movable blocks reduces interference problems.

The activator bar is advantageously slightly harder steel than the die body to avoid galling, but it retains the same expansion ratio. Moreover, the push/pull blocks and spacer mounts beneficially have expansion ratios similar to the actuator bar and die body.

Indicators and/or graduated scales used to measure the gap opening, are more reliable for providing precise measurement.

The adjustability allows an operator to quickly open the lips to release or flush out any foreign objects or degraded material. Such objects or material may cause streaks or "die lines" to be formed in the product as the product exits from the die.

While particular embodiments of the extrusion die have been shown and described, it will be appreciated by those skilled in the art that modifications may be made without departing from the invention in its broader aspects and as set forth in the following claims.

I claim:

1. An extrusion apparatus comprising
   a first body portion and a second body portion each associated with a lip forming an exit slot of a flow passageway, wherein one of the lips is flexible for adjusting the gap of said exit slot, and said second body portion is associated with the flexible lip;
   a plurality of spaced apart, reciprocally movable members each including an angled slot and in operable and direct contact with the flexible lip at a plurality of locations; and
   a generally laterally movable actuator bar comprising spaced apart bores and connected with said plurality of reciprocally movable members by a plurality of pin members comprising head portions slidably engaged with said angled slots and shaft portions rotatably mounted in said actuator bar bores.

2. The apparatus of claim 1, wherein said pin members are removably mounted in said actuator bar, said head portions are generally elongated and comprise opposing parallel faces, and said reciprocally movable members are engaged with said flexible lip.

3. The apparatus of claim 1, wherein each of said plurality of reciprocally movable members has an angled slot, and the angled slots are disposed at the same angle.

4. The apparatus of claim 1, wherein at least one of said plurality of reciprocally movable members has an angled slot disposed at a different angle than the angled slots of other of said plurality of reciprocally movable members.

5. The apparatus of claim 1, further comprising a plurality of spacer mounts fastened to said second body portion and disposed between and spacing apart said plurality of reciprocally movable members, said spacer mounts preventing lateral movement of said reciprocally movable members.

6. The apparatus of claim 5, further comprising a cover plate covering said reciprocally movable members and secured to said spacer mounts.

7. The apparatus of claim 6, wherein an upper portion of said cover plate is unsecured to said spacer mounts.

8. The apparatus of claim 1, wherein generally lateral movement of said actuator bar is limited by contact of an end of said actuator bar with a stop surface prior to contact of said pin members with movement-limiting structures; and single point adjusting means for moving said flexible lip across its full width.

9. The apparatus of claim 5, further comprising deckle means externally mounted to a portion of said exit slot by a generally laterally disposed bar member secured to said spacer mounts whereby contact of said deckle means with said exit slot is unaffected by movement of said reciprocally movable members.

10. The apparatus of claim 1, further comprising indicator means for detecting and measuring movement of at least one of said reciprocally movable members, said indicator means comprising a reciprocally movable extension in contact with said at least one of said reciprocally movable members.

11. The apparatus of claim 1, wherein the other of said lips is flexible and is associated with said first body portion; and wherein said extrusion apparatus comprises means for adjusting said gap by flex of said other of said lips.

12. An extrusion apparatus comprising
   a first body portion and a second body portion each associated with a lip forming an exit slot of a flow passageway, wherein one of the lips is flexible for adjusting the gap of said exit slot, and said second body portion is associated with the flexible lip;
   at least one reciprocally movable member in operable contact with said flexible lip;
   a generally laterally movable actuator bar for actuating said reciprocally movable member to adjust said gap along the exit slot; and
   a control assembly for said actuator bar comprising
   a generally laterally disposed adjustment stud having a first end connected with said actuator bar, a multi-sided non-circular portion which surrounds a portion of said adjustment stud disposed between said first end and an opposite end of said adjustment stud; and
   a locking member secured to said second body portion and comprising a throughbore of a cross-sectional shape and size adapted to receive said non-circular portion, prevent said non-circular portion from rotating within said throughbore, and yet allow said adjustment stud and non-circular portion to move generally laterally within said throughbore, said non-circular portion being disposed within said locking member.

13. The apparatus of claim 12, further comprising a rotatable member in connection with said opposite end of said adjustment stud, for effecting generally lateral movement of said actuator bar through clockwise and counterclockwise rotation.

14. The apparatus of claim 13, wherein said control assembly further comprises thrust bearings disposed on at least one side of a flange of said rotatable member.

15. The apparatus of claim 12, wherein said opposite end of said adjustment stud comprises a bore in which a threaded end of an adjustment indicator member is disposed.

16. The apparatus of claim 12, wherein said extrusion apparatus further comprises a side plate and said portion of said adjustment stud bearing said non-circular portion, extends through said side plate.

17. The apparatus of claim 12, wherein said non-circular portion is hexagonal in shape, and said locking member comprises a plurality of radially elongated mounting slots and a generally cylindrical tail portion of decreased diameter for seating in a mating recess in said second body portion.

* * * * *